United States Patent
Huang et al.

(10) Patent No.: US 6,445,148 B2
(45) Date of Patent: Sep. 3, 2002

(54) STRUCTURE OF PLURAL MOTOR ASSEMBLY AND METHOD FOR CONTROLLING THE SAME

(75) Inventors: Wen-Shi Huang, Taoyuan Shien; Kuo-Chen Lin, Taoyuan; Ming-Shi Tsai, Taipei, all of (TW)

(73) Assignee: Delta Electronics Inc. (CN)

( * ) Notice: Subject to any disclaimer, the term of this patent is extended or adjusted under 35 U.S.C. 154(b) by 0 days.

(21) Appl. No.: 09/732,845

(22) Filed: Dec. 8, 2000

(30) Foreign Application Priority Data

Feb. 22, 2000 (TW) .......................... 089103088

(51) Int. Cl.$^7$ ................................ H02P 7/80
(52) U.S. Cl. ..................... 318/34; 318/564; 310/62; 310/63; 700/19
(58) Field of Search ............. 310/62, 63; 700/19; 318/564, 45, 254, 34; 388/908

(56) References Cited

U.S. PATENT DOCUMENTS

| | | | |
|---|---|---|---|
| 3,950,686 A | * | 4/1976 | Randall .................. 318/564 |
| 4,503,369 A | * | 3/1985 | Nishijima et al. .......... 318/254 |
| 4,948,998 A | * | 8/1990 | Fink et al. ................ 310/127 |
| 5,438,226 A | * | 8/1995 | Kuchta .................... 307/125 |
| 5,478,214 A | * | 12/1995 | Howarth et al. .......... 417/423.5 |
| 5,559,415 A | * | 9/1996 | Gregory et al. ............ 318/609 |
| 5,790,430 A | * | 8/1998 | Steiert .................... 364/565 |
| 6,246,192 B1 | * | 6/2001 | Haass ..................... 318/112 |
| 6,271,638 B1 | * | 8/2001 | Erdman et al. ............. 318/439 |

* cited by examiner

Primary Examiner—Robert E. Nappi
Assistant Examiner—Rita Leykin
(74) Attorney, Agent, or Firm—Webb Ziesenheim Logsdon Orkin & Hanson, P.C.

(57) ABSTRACT

A plural motor assembly includes a first motor generating a parameter, a control circuit electrically connected to the first motor for detecting the parameter and outputting a switch signal while the parameter is abnormal, and a second motor electrically connected to the control circuit and operating in response to the switch signal. Thus, when one motor is damaged, the speed of rotation of the other motor is increased to maintain normal operation.

9 Claims, 4 Drawing Sheets

STRUCTURE OF PLURAL MOTOR ASSEMBLY AND METHOD FOR CONTROLLING THE SAME

FIELD OF THE INVENTION

The present invention relates to a structure of a plural motor assembly, and more particularly to a method for controlling the plural motor assembly.

BACKGROUND OF THE INVENTION

A typical structure of a direct current brushless motor for a fan usually includes a motor, a fan, and a printing circuit broad. A control circuit is established on the printing circuit broad for controlling the rotation of the motor.

However, while a motor is damaged, it is replaced with a new one, which is not only inconvenient but also time-consuming. Thus, an innovative structure of a plural motor assembly is provided to overcome the above problem. Furthermore, a method for controlling the plural motor assembly is also proposed for facilitating rotation.

SUMMARY OF THE INVENTION

It is therefore an object of the present invention to propose a structure of a plural motor assembly for maintaining a normal operation.

It is therefore another object of the present invention to propose a method for controlling the plural motor assembly for driving another motor when one motor is damaged.

According to an aspect of the present invention, the structure of the plural motor assembly comprises a first motor generating a parameter, a control circuit electrically connected to the first motor for detecting the parameter and outputting a switch signal while the parameter is abnormal, and a second motor electrically connected to the control circuit and operating in response to the switch signal.

Certainly, the parameter can be a rotation speed signal. The rotation speed signal can be a square wave signal.

Certainly, the first motor and the second motor can be adapted to be employed in a first fan and a second fan, respectively.

Preferably, the first motor and the second motor are formed a coaxial structure.

In accordance with another aspect of the present invention, there is provided a control circuit which comprises a frequency-voltage converter for detecting the rotation speed signal and converting the rotation speed signal into a rotation speed voltage value, a comparing circuit electrically connected to the frequency-voltage converter for comparing the rotation speed voltage value with a reference voltage value and generating a driving signal while the rotation speed voltage value is smaller than the reference voltage value, and a controlling switcher electrically connected to the comparing circuit for outputting a switch signal in response to the driving signal.

Certainly, the structure of the plural motor assembly can include at least two motors electrically connected to the control circuit.

According to another aspect of the present invention, there is provided a method for controlling the plural motor assembly which comprises steps of using a control circuit to drive a first motor generating a parameter, detecting the parameter and outputting a switch signal while the parameter is abnormal, and operating a second motor in response to the switch signal.

Certainly, the parameter can be a rotation speed signal.

The present invention may best be understood through the following description with reference to the accompanying drawings, in which:

DESCRIPTION OF THE PREFERRED EMBODIMENTS

Figure 1:
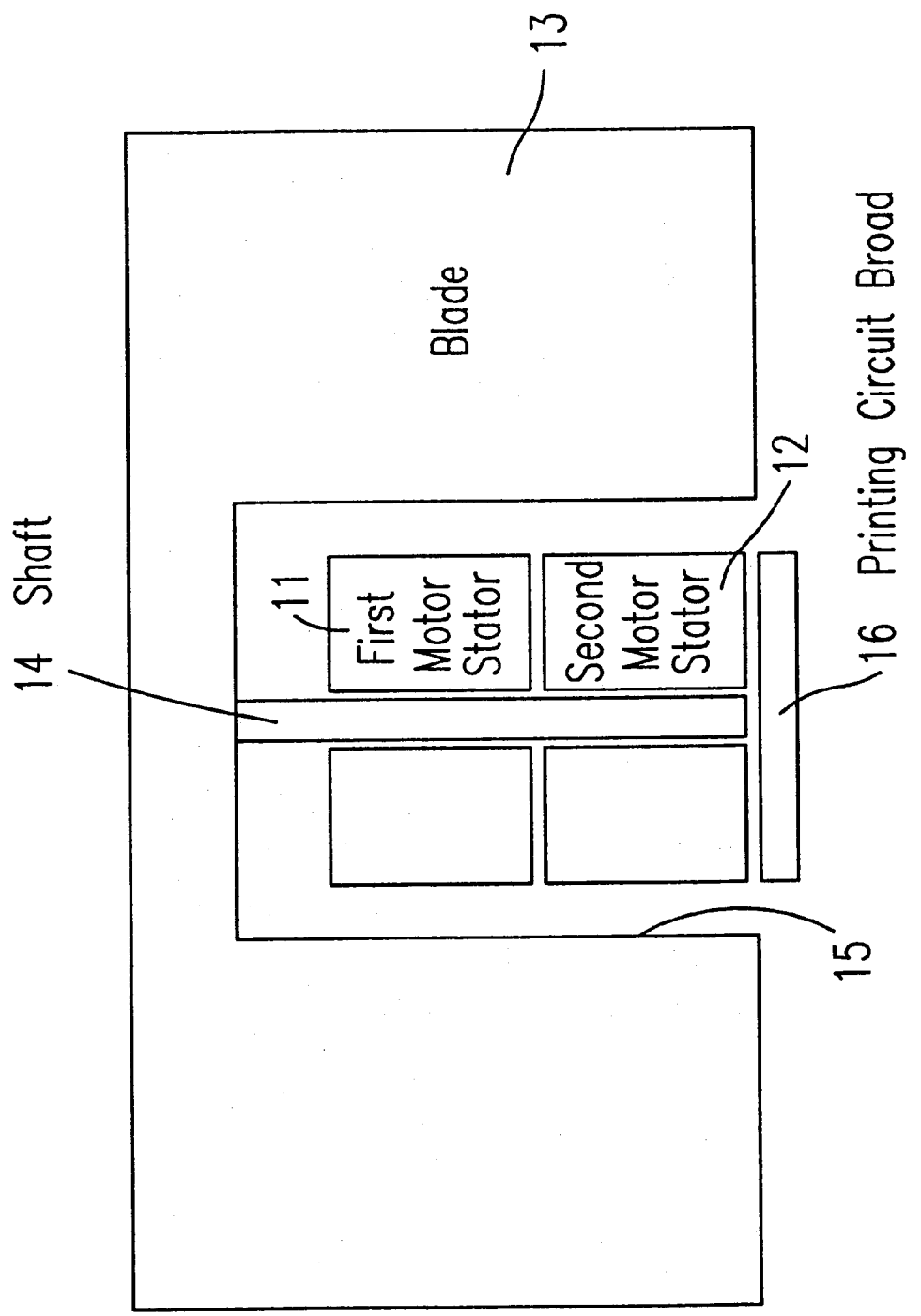
FIG. 1 is a schematic diagram illustrating a structure of the plural motor assembly according to the first preferred embodiment of the present invention.

As shown in FIG. 1, the plural motor assembly according to the present invention is applied to the fan. Such assembly includes a stator 11 of a first motor, a stator 12 of a second motor, a control circuit established on a printing circuit board 16, and a shared shaft 14 connected to the stators 11 and 12. The shared shaft 14 is also connected to the blade 13 of the fan. Furthermore, the internal cylinder wall 15 of the fan has a magnet for generating a magnetic field interacted with the magnetic field created from the stators 11 and 12 to drive the rotation of the fan.

Figure 2:
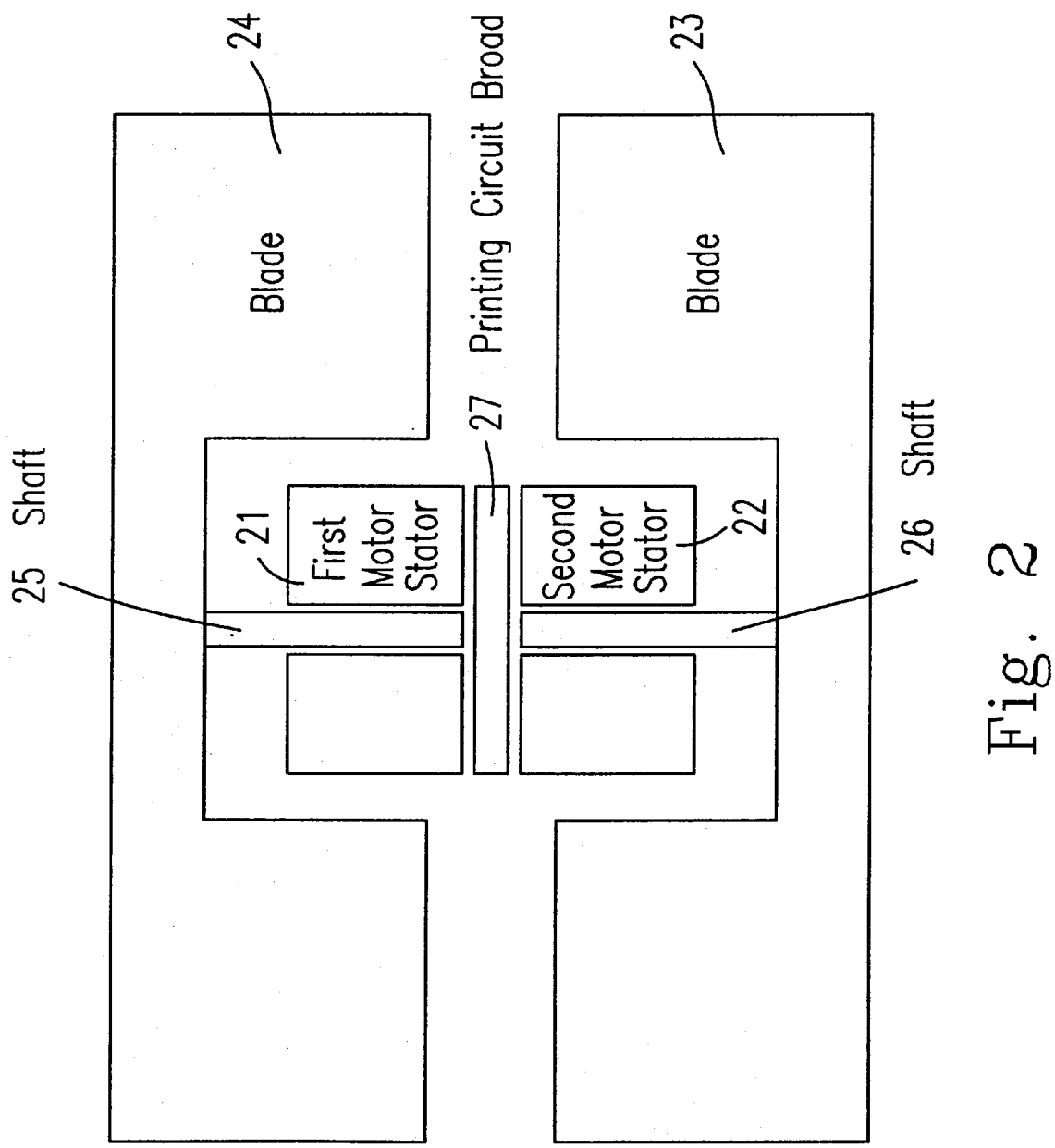
FIG. 2 is a schematic diagram illustrating a structure of the plural motor assembly according to the second preferred embodiment of the present invention.

FIG. 2 shows another plural motor assembly according to the second embodiment of the present invention. The assembly includes two sets of motors, shafts, and fans, wherein a shaft 25 is connected to a fan blade 24 and a stator 21 of a first motor, and a shaft 26 is connected to a fan blade 23 and a stator 22 of a second motor. The plural motor assembly is controlled by a control circuit established on a printing circuit board 27. Thus, when one of the two motors breaks down, the control circuit drives the other motor to increase its rotation speed to maintain the total quantity of wind.

Figure 3:
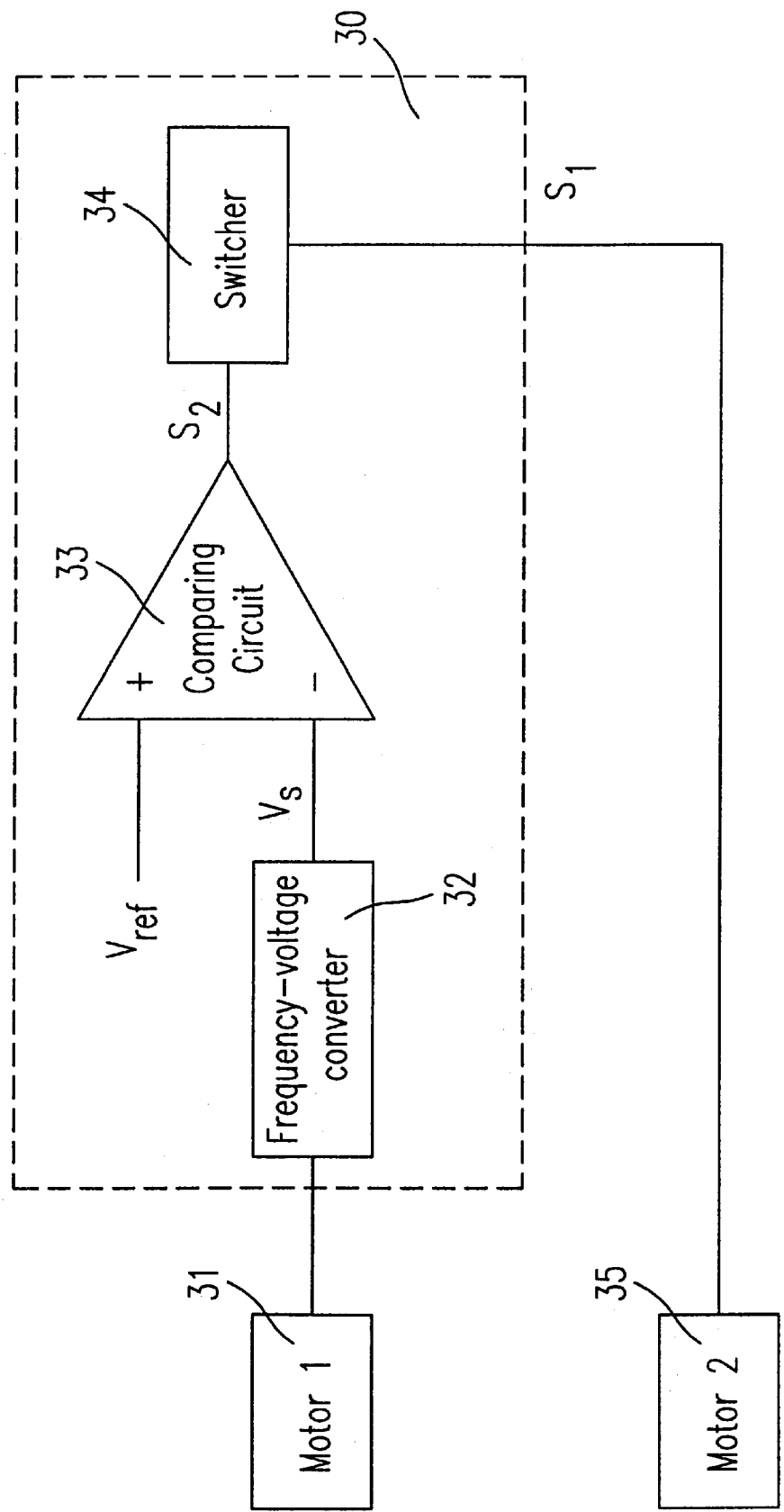
FIG. 3 is a diagram illustrating the control circuit of the plural motor assembly according to the present invention.

FIG. 3 shows the diagram of the control circuit of the plural motor assembly according to the present invention. As shown in FIG. 3, a first motor 31 is used for generating a rotation speed signal FG into a control circuit 30. The control circuit 30 will detect the rotation speed signal FG and can output a switch signal S1 while the rotation speed signal FG is abnormal. Thus, a second motor 35 will be started in response to the switch signal S1.

In addition, a frequency-voltage converter 32 of the control circuit is used to detect the rotation speed signal FG and convert the rotation speed signal FG into a rotation speed voltage value Vs. The rotation speed voltage value Vs is compared with a reference voltage value Vref. While the rotation speed voltage value Vs is smaller than the reference voltage value Vref, a comparing circuit 33 will deliver a driving signal S2 into a switcher 34 and output a switch signal S1 in response to the driving signal S2. Generally, the rotation speed signal FG is a square wave.

Figure 4:
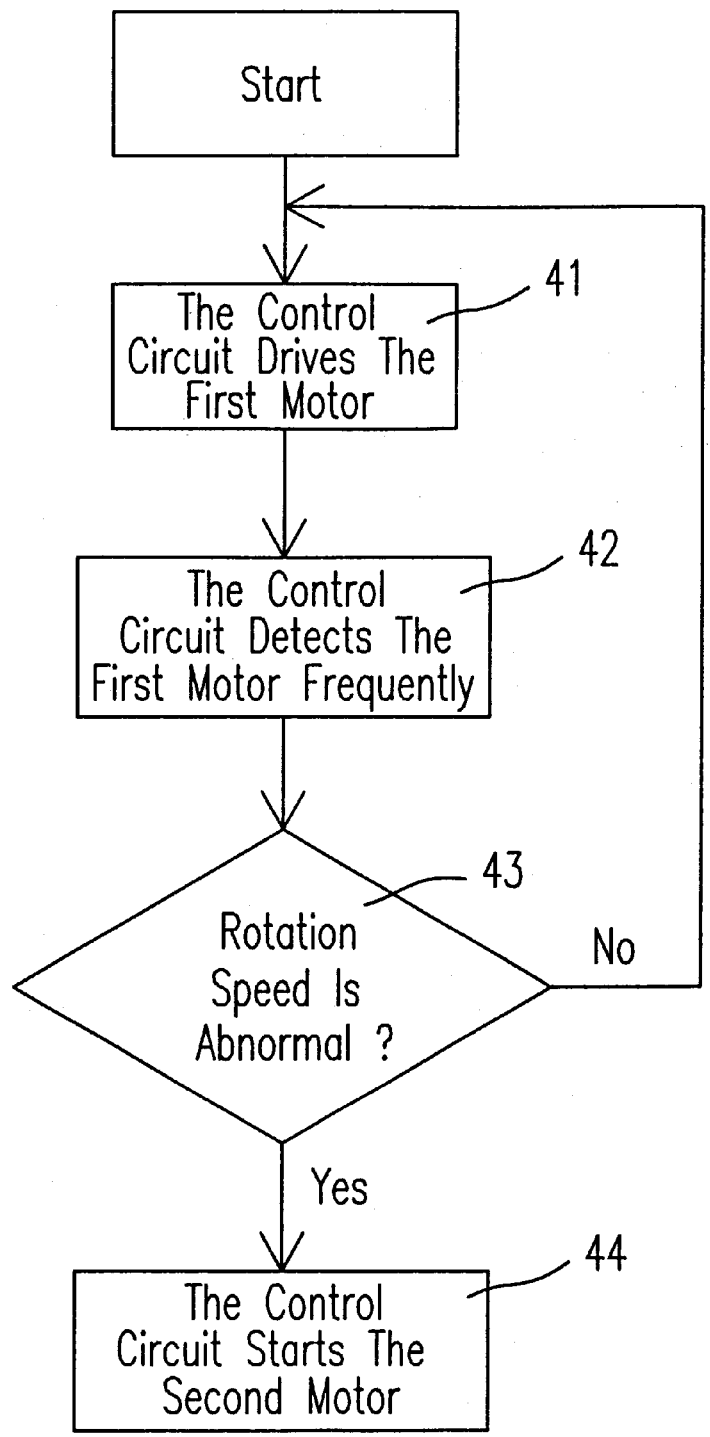
FIG. 4 is a flow chart illustrating the control method of the plural motor assembly according to the present invention.

FIG. 4 is a flow chat illustrating the control method of the plural motor assembly according to the present invention. The procedure includes the following steps:

(41) the control circuit drives the first motor operating;

(42) the control circuit detects frequently the rotation speed signal FG generated from the first motor;

(43) if the rotation speed signal is abnormal, then a switch signal S1 is outputted, otherwise, the steps 41 to 43 are repeated; and

(44) rotation speed of the second motor is increased in response to the switch signal S1.

The connected portion of two motors is the circuit part, which does not affect whether the motor action or not. Therefore, there is a fan having two motors which rotate at the same speed. While the rotation speed of one of motors becomes slower for some reasons, the control circuit will output a signal to drive another motor increasing the rotation speed in order to maintain the total quantity of wind.

In sum, the advantages of the present invention are:

1. The control circuit of the present invention can drive another motor to increase its rotation speed to maintain the rotation of the fan continuously while one of the motors is abnormal.
2. The present invention can increase the reliability of the system.
3. The method for controlling the plural motor assembly can be applied to the switching control for the plural motor assembly having more than two motors.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A structure of a plural motor assembly, comprising:

a first motor generating a parameter;

a control circuit electrically connected to said first motor for detecting said parameter, and outputting a switch signal while said parameter is abnormal; and a second motor electrically connected to said control circuit and operating in response to said switch signal, wherein said first motor and said second motor are initially operating at the same speed, and while said parameter is abnormal said second motor increases said speed in response to said switch signal.

2. The structure according to claim 1, wherein said parameter is a rotation speed signal.

3. The structure according to claim 2, wherein said rotation speed signal is a square wave signal.

4. The structure according to claim 1, wherein said first motor and said second motor are adapted to be employed in a first fan and a second fan, respectively.

5. The structure according to claim 1, wherein said first motor and said second motor are formed a coaxial structure.

6. The structure according to claim 1, wherein said control circuit comprises:

a frequency-voltage converter for detecting said rotation speed signal, and converting said rotation speed signal into a rotation speed voltage value;

a comparing circuit electrically connected to said frequency-voltage converter for comparing said rotation speed voltage value with a reference voltage value, and generating a driving signal while said rotation speed voltage value is smaller than said reference voltage value; and a controlling switcher electrically connected to said comparing circuit for outputting said switch signal in response to said driving signal.

7. The structure according to claim 1, wherein said plural motor assembly comprises at least two motors electrically connected to said control circuit.

8. A method for controlling a plural motor assembly, comprising steps of:

using a control circuit to drive a first motor generating a parameter;

detecting said parameter, and outputting a switch signal while said parameter is abnormal; and operating a second motor in response to said switch signal, wherein said first motor and said second motor are initially operating at the same speed, and while said parameter is abnormal said second motor increases said speed in response to said switch signal.

9. The method according to claim 8, wherein said parameter is a rotation speed signal.

* * * * *